US011621850B2

(12) United States Patent
Nishijima

(10) Patent No.: US 11,621,850 B2
(45) Date of Patent: Apr. 4, 2023

(54) DISTRIBUTED LEDGER MANAGEMENT METHOD, DISTRIBUTED LEDGER SYSTEM, AND NODE

(71) Applicant: Hitachi, Ltd., Tokyo (JP)

(72) Inventor: Nao Nishijima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 17/185,744

(22) Filed: Feb. 25, 2021

(65) Prior Publication Data

US 2021/0336793 A1    Oct. 28, 2021

(30) Foreign Application Priority Data

Apr. 22, 2020 (JP) .............................. JP2020-076281

(51) Int. Cl.
*H04L 29/06* (2006.01)
*H04L 9/32* (2006.01)
*H04L 9/00* (2022.01)

(52) U.S. Cl.
CPC .......... *H04L 9/3236* (2013.01); *H04L 9/3297* (2013.01); *H04L 9/50* (2022.05); *H04L 2209/463* (2013.01)

(58) Field of Classification Search
CPC ....... H04L 9/3236; H04L 9/3297; H04L 9/50; H04L 2209/463; H04L 9/3234; H04L 9/3239
See application file for complete search history.

(56) References Cited

U.S. PATENT DOCUMENTS

| 10,558,955 | B2* | 2/2020 | Haldenby | H04L 63/0876 |
|---|---|---|---|---|
| 11,416,475 | B2* | 8/2022 | Albright | H04L 9/50 |
| 2018/0189312 | A1* | 7/2018 | Alas | H04L 9/3239 |
| 2018/0365686 | A1* | 12/2018 | Kondo | G06Q 20/382 |
| 2019/0273605 | A1* | 9/2019 | Gabriel | H04L 9/3239 |
| 2020/0151350 | A1* | 5/2020 | Irazabal | G06F 16/2308 |
| 2021/0194672 | A1* | 6/2021 | Narayanam | H04L 9/3239 |

FOREIGN PATENT DOCUMENTS

JP    2019-008791 A    1/2019

* cited by examiner

*Primary Examiner* — Sharon S Lynch
*Assistant Examiner* — Lin Chang
(74) *Attorney, Agent, or Firm* — Procopio, Cory, Hargreaves & Savitch LLP

(57) ABSTRACT

A distributed ledger management method performed by each of nodes 211 configuring a distributed ledger system, includes: holding, in an end block 102, signatures of respective organizations operating the respective nodes, hash values of respective groups of blocks into which a blockchain 215 is divided by a number of the operating organizations, information on organizations by which the group of blocks is to be held, and a verification frequency for the hash value between the organizations; specifying a group of blocks to be held by the organization; deleting a block other than the group of blocks in the blockchain 215; and performing a tamper verification of requesting a node 211 of another organization to transmit the hash value of the group of blocks to be held by the other organization at a verification frequency, and collating the hash value with the hash value included in the end block 102.

9 Claims, 5 Drawing Sheets

DISTRIBUTED LEDGER MANAGEMENT METHOD, DISTRIBUTED LEDGER SYSTEM, AND NODE

CROSS-REFERENCE TO RELATED APPLICATION

This application claims priority pursuant to 35 U.S.C. § 119 from Japanese Patent Application No. 2020-076281, filed on Apr. 22, 2020, the entire disclosure of which is incorporated herein by reference.

BACKGROUND

1. Technical Field

The present disclosure relates to a distributed ledger management method, a distributed ledger system, and a node.

2. Related Art

Blockchain is one of the distributed ledger technologies. A blockchain is a kind of distributed database, which is a series of blocks in which transactions which have been issued from respective nodes and on which a consensus has been built are grouped in every fixed period.

Each of the blocks configuring the above-described blockchain includes a time stamp and a hash value of the previous block. Therefore, it is very difficult to retroactively change any single block of the blockchain. In other words, it can be said that it has high tamper resistance.

Such a blockchain is distributed to a plurality of locations on a distributed ledger network, that is, to each distributed ledger node, and is stored with the same content. In other words, data held on the blockchain is not held and managed centrally as in conventional systems.

Also in the blockchain, smart contracts can be used to automatically execute and manage transactions as appropriate, and to flexibly implement various functions.

Here, as a conventional technique for managing smart contracts, for example, there is proposed a system, for the purpose of managing the life cycle of smart contracts, in which for a predetermined smart contract being set with an indicator indicating that the smart contract has reached the expiration, a transaction result is withheld from being written to the blockchain but is transmitted to a computing device (see Japanese Patent Application Laid-Open No. 2019-008791).

Incidentally, data stored on a blockchain may include data that is legally required to be stored for a certain period of time. For example, account book data shall be retained for seven years.

Therefore, if the blockchain is to be stored for a specified number of years, it will be necessary to manage a huge amount of data for a long period of time. This requires the blockchain administrator to continue to maintain various resources such as computers, networks, and their management personnel.

An objective of the present disclosure is to provide a technique for efficiently storing data stored in a blockchain, for a long period of time.

SUMMARY

A distributed ledger management method of this disclosure that resolves the objective performed by each of nodes configuring a distributed ledger system, the distributed ledger management method comprising: holding, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations; specifying a group of blocks to be held by the organization operating the node by the transaction of the end block; deleting a block other than the specified group of blocks in the blockchain; and performing a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

A distributed ledger system of this disclosure comprising nodes, each of the nodes comprising: a storage device configured to hold a blockchain that holds, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations; and a computing device configured to: specify a group of blocks to be held by the organization operating the node by the transaction of the end block, delete a block other than the specified group of blocks in the blockchain, and perform a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

A node of this disclosure that is one of nodes configuring a distributed ledger system, the node comprising: a storage device configured to hold a blockchain that holds, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations; and a computing device configured to: specify a group of blocks to be held by the organization operating the node by the transaction of the end block, delete a block other than the specified group of blocks in the blockchain, and perform a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

Advantageous Effects of Invention

According to the present disclosure, it is possible to efficiently store the data stored in the blockchain for a long period of time.

DESCRIPTION OF EMBODIMENTS

<<Configuration of Distributed Ledger System>>

Figure 1:
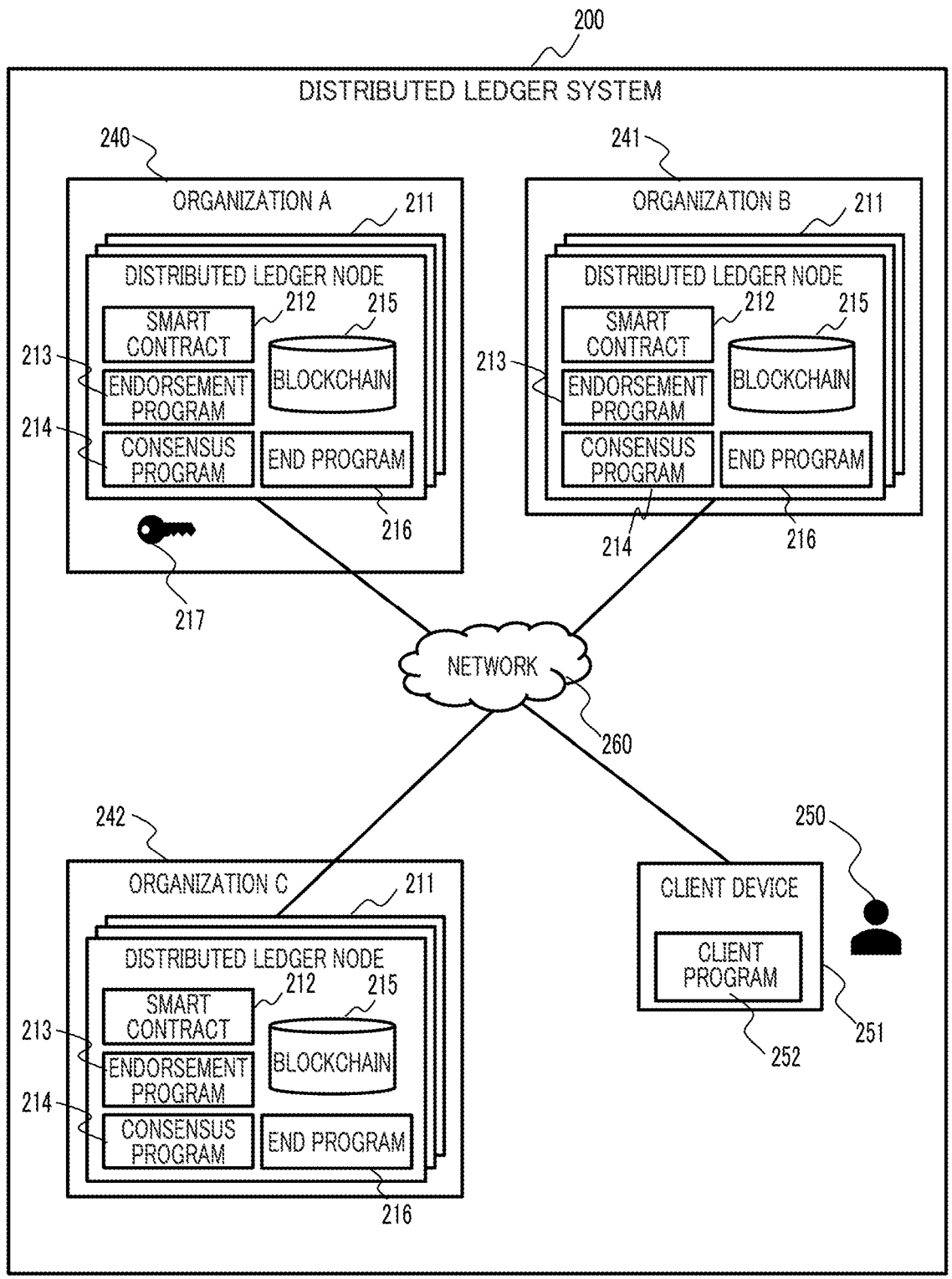
FIG. 1 is a diagram illustrating a configuration example of a distributed ledger system according to the present embodiment.

Embodiments of the present disclosure will be described below in detail with reference to the drawings. FIG. 1 is a diagram illustrating a configuration example of a distributed ledger system 200 according to the present embodiment. The distributed ledger system 200 illustrated in FIG. 1 is a computer system capable of efficiently storing data stored in a blockchain for a long period of time.

The distributed ledger system 200 illustrated in FIG. 1 is configured to include, for example, three distributed ledger nodes 211 operated by three organizations 240 to 242, respectively. This system configuration also includes or is accessible to a client device 251 that allows persons in charge of the organizations to use.

The distributed ledger nodes 211 of their respective organizations 240 to 242 are communicably connected via an appropriate network 260 such as the Internet and a LAN (Local Area Network). Note that it is assumed that each organization operates one or more distributed ledger nodes 211.

Further, each of the distributed ledger nodes 211 is an information processing device having a smart contract 212, an endorsement program 213, a consensus program 214, a blockchain 215, and an end program 216.

The smart contract 212 held by the distributed ledger node 211 is a program that executes a contract with a consensus built between the organizations. The smart contract 212 is also executed by the endorsement program 213.

On the other hand, the endorsement program 213 executes the above-described smart contract 212 and performs an electric signature on the execution result using a private key 217 of the organization in order to leave a trail.

Further, the consensus program 214 receives the signed execution result of the smart contract 212 from a client program 252 of the client device 251 and checks whether or not the signed execution result includes a required number of signatures of the organizations.

At this time, if the required number of signatures of the organizations are included, the consensus program 214 transmits this transaction to a reader of the consensus program 214. On the other hand, the reader stores the received transaction in a block and distributes the block to the distributed ledger nodes 211 of their respective organizations.

Each of the distributed ledger nodes 211 receives the block distributed from the consensus program 214 of another distributed ledger node 211, and stores the block in its own blockchain 215.

Note that the end program 216 in the present embodiment performs, based on information indicated by an end block 102 (described below) in the blockchain 215, process of deleting a predetermined block and a process of verifying whether the blockchain 215 held in the distributed ledger node 211 of each organization has been tampered with.

On the other hand, the client device 251 executes the client program 252 in response to an operation from, for example, a person in charge 250. By this execution, the client device 215 transmits a request to execute the smart contract 212 to the endorsement program 213 of the distributed ledger node 211 via the network 260.

<<Hardware Configuration>>

Figure 2:
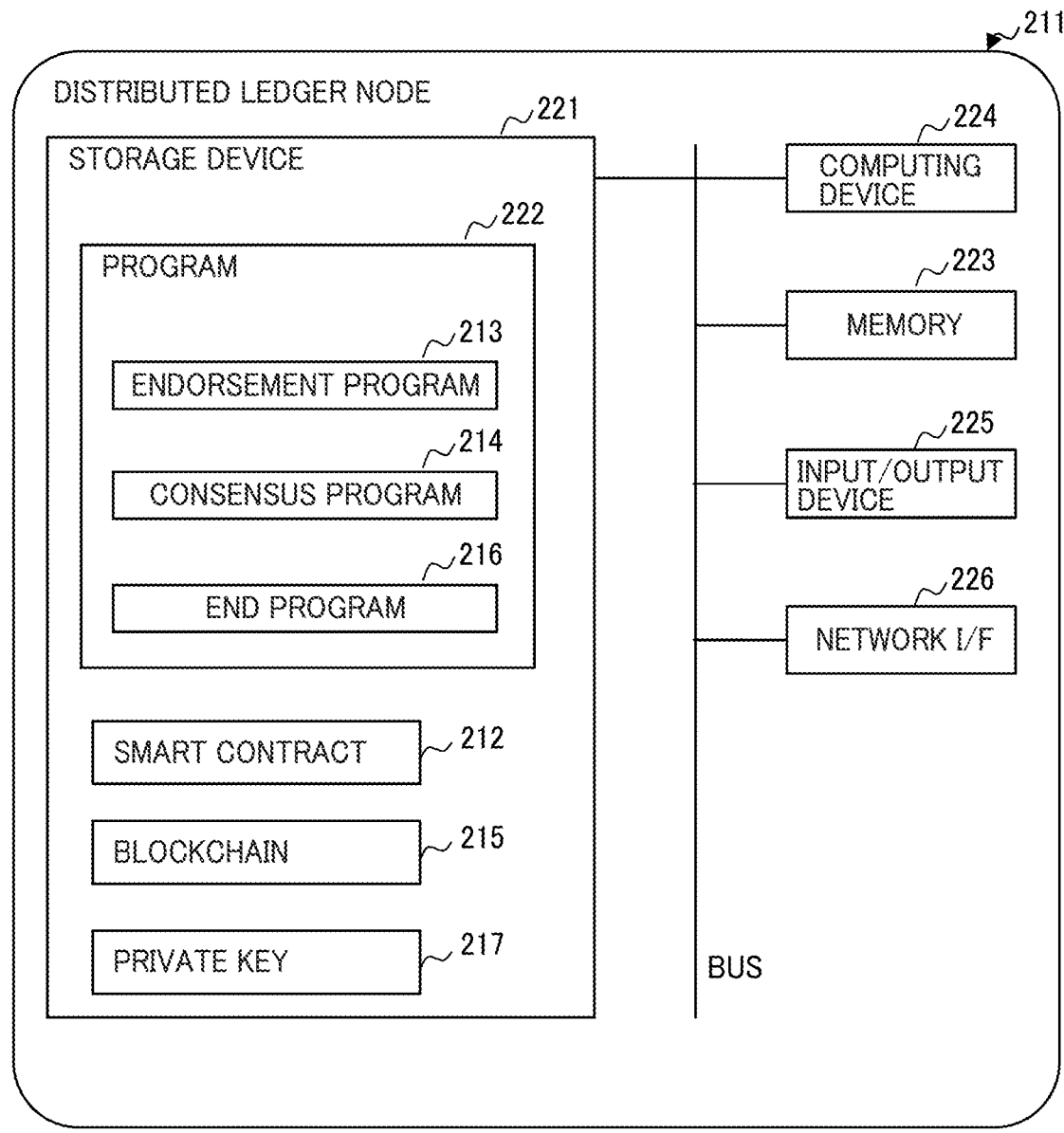
FIG. 2 is a diagram illustrating a configuration example of a distributed ledger node in the present embodiment.

FIG. 2 illustrates a hardware configuration example of the distributed ledger node 211 configuring the distributed ledger system 200 described above. Note that each of the distributed ledger nodes 211 may be configured from a plurality of physical servers or any number of techniques, or may be configured from a single server.

The distributed ledger node 211 according to the present embodiment includes a storage device 221, a memory 223, a computing device 224, an input/output device 225, and a network IF 226.

Of these devices, the storage device 221 includes a suitable nonvolatile storage element such as an SSD (Solid State Drive) or a hard disk drive.

The memory 223 includes a volatile storage element such as a RAM.

The computing device 224 is a CPU that loads programs 222 stored in the storage unit 221 into the memory 223 to execute them so that the distributed ledger node 211 is integrally controlled and various determinations, computation, and control processing are performed.

The input/output device 225 is an appropriate device such as a keyboard, mouse, or microphone that receives key input or voice input from a user, and is also an appropriate device such as a display or speaker that outputs data processed in the computing device 224.

The network interface 226 is a communication device that is connected to the network 260 and is responsible for communication processing with other distributed ledger nodes 211 and the client device 251.

Note that in addition to the above-described program 222 for implementing functions required as the distributed ledger node 211 according to the present embodiment, at least the smart contract 212, the blockchain 215, and the private key 217 are stored in the storage device 221.

<<Distributed Ledger Management Method>>

An actual procedure of a distributed ledger management method according to the present embodiment will be described below with reference to the drawings. Various operations corresponding to the distributed ledger management method described below are implemented by the distributed ledger node 211 reading a program into a memory or the like and executing it. The program is composed of codes for performing various operations described below.

Figure 3:
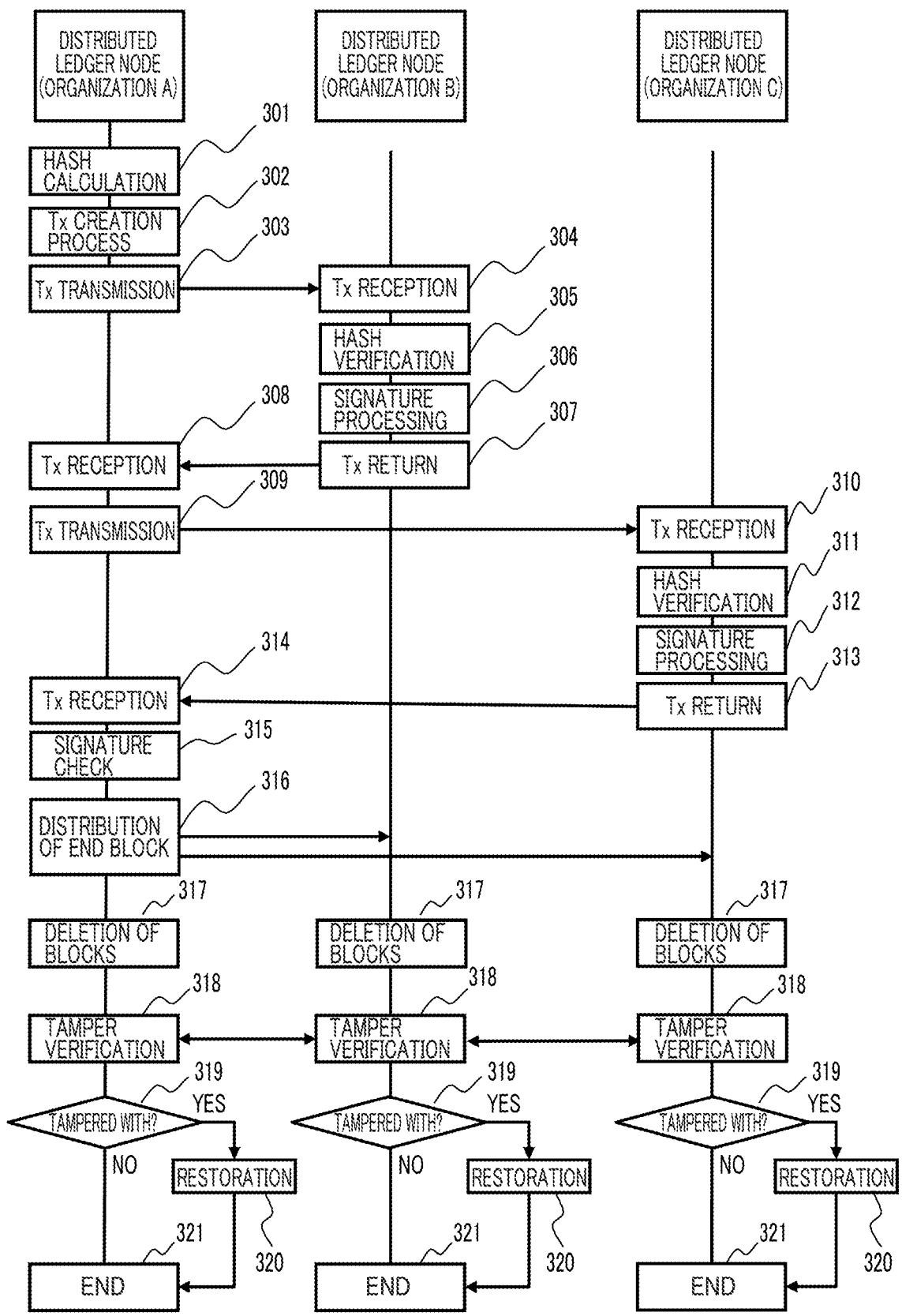
FIG. 3 is a sequence diagram of a distributed ledger management method according to the present embodiment.

FIG. 3 is a sequence diagram of the distributed ledger management method according to the present embodiment. Here, illustrated herein is the operation of the distributed ledger node 211 of each organization to create an end block and manage the blockchain 215 by using the end program 216.

Note that it is assumed that as a trigger for this sequence, for example, a person in charge of a certain organization (hereinafter, organization A) operates the client device 251 to access the distributed ledger node 211 of his/her own organization and call the end program 216.

The end program 216 acquires information about the end block input by the above-described person in charge in the client device 251, and based on this information, divides the blockchain 215 into groups of the above-described number of organizations (three in the case of the present embodiment), and calculates a hash value of each group (step 301).

Figure 4:
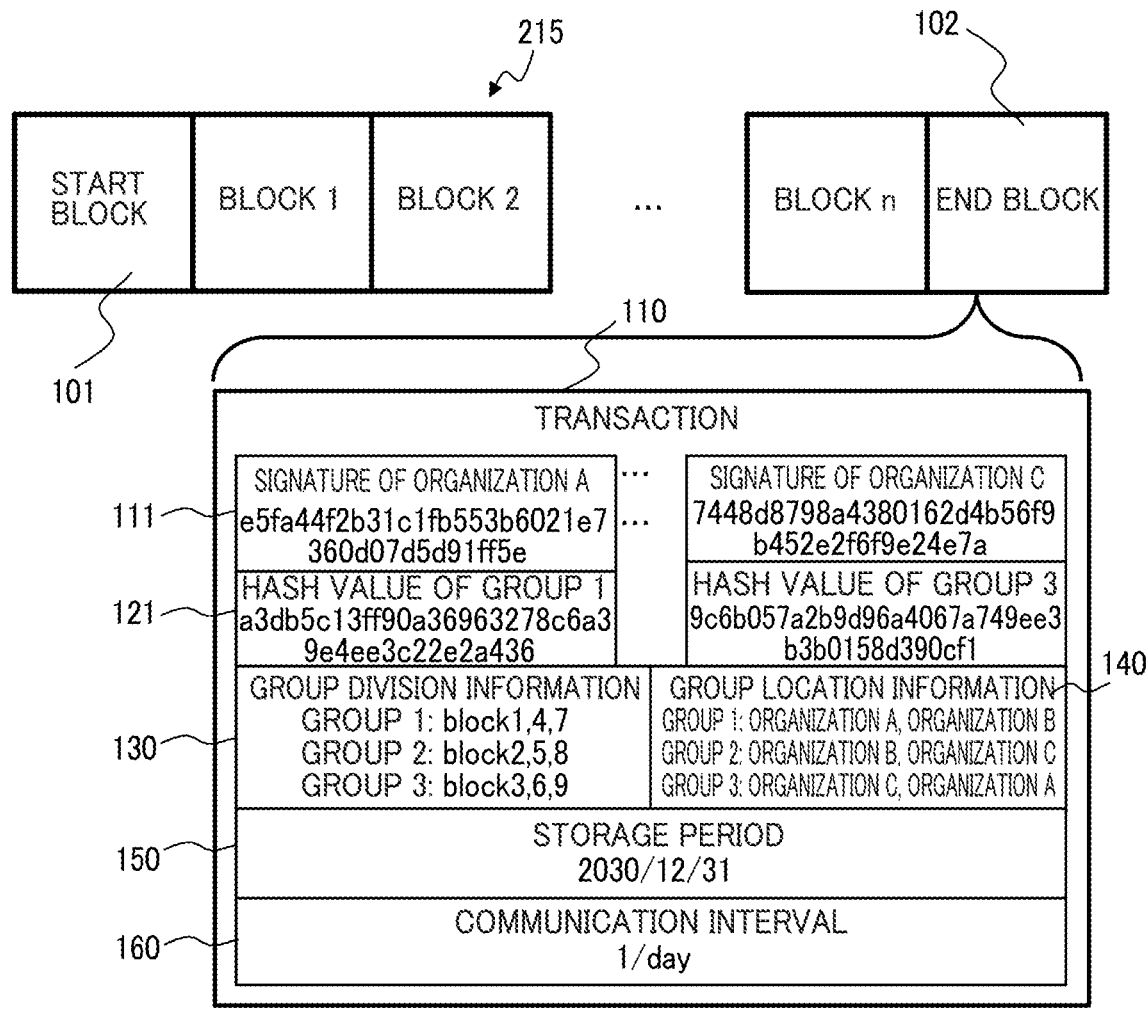
FIG. 4 is a diagram illustrating a configuration example of an end block in the present embodiment.

Note that the above-described information about the end block are values of group division information 130 and group location information 140, which are exemplified with respect to the end block 102 in FIG. 4.

Of these pieces of information, the group division information 130 defines blocks belonging to a group (blocks) that is a respective one of groups into which the blockchain 215 is divided by the number of organizations involved in the operation of the distributed ledger system 200, as illustrated in a specific example of a transaction 110 in the end block 102 (FIG. 4).

The group location information 140 defines information on organizations by which each of the above-described groups (of blocks) is to be held.

Subsequently, the end program 216 creates a transaction including the pieces of information of the hash values of the respective groups calculated in step 301 described above, the group division information 130 and the group location information 140 received from the client device 251, a storage period 150, and a communication interval 160, and signs the transaction with the private key 217 (step 302).

Here, the storage period 150 and the communication interval 160 described above are also received from the client device 251.

Of these, the storage period 150 is information that defines a period of time for which the information included in the blockchain 215 is to be stored. As a specific example of the storage period 150, "2030/12/31" indicated by the transaction 110 in the end block 102 of FIG. 4 can be set. In this example, instead of a period of time, a date corresponding to the deadline for the end of the storage is set.

The communication interval 160 is information about the frequency at which the hash value is to be verified between the organizations to determine whether the information included in the blockchain 215 has been tampered with. As a specific example of the communication interval 160, "1/day" indicated by the transaction 110 in the end block 102 of FIG. 4 can be set. This example indicates a rule of performing communication for a tamper verification once a day.

The end program 216 transmits the transaction created in step 302 described above to, for example, the end program 216 in the distributed ledger node 211 of organization B (step 303).

On the other hand, the end program 216 in the distributed ledger node 211 of organization B receives the transaction transmitted from the distributed ledger node 211 of organization A described above (step 304).

The end program 216 in the distributed ledger node 211 of organization B creates groups into which the blockchain 215 of its own organization is divided by the number of organizations based on the group division information 130 included in the transaction received in step 304, calculates hash values of the respective groups, and compares the calculated values with the hash values of the respective groups included in the transaction described above (step 305).

Subsequently, if the result of comparison described above indicates that there is no difference between the hash values, the end program 216 in the distributed ledger node 211 of organization B causes the client device 251 of organization B to display information for confirmation as to whether the storage period 150 and the communication interval 160 are as expected, and receives a confirmation operation from the person in charge 250 (step 306). As a result of this confirmation operation, when information indicating that the person in charge 250 intends to accept the storage period 150 and the communication interval 160 is input in the client device 251, the end program 216 receives that information, and signs the transaction received in step 304 with the private key 217.

The end program 216 in the distributed ledger node 211 of organization B transmits the signed transaction to the end program 216 in the distributed ledger node 211 of organization A (step 307).

On the other hand, the end program 216 in the distributed ledger node 211 of organization A receives the transaction transmitted from the distributed ledger node 211 of organization B (step 308).

The end program 216 in the distributed ledger node 211 of organization A transmits the transaction received in step 308 to the end program 216 in the distributed ledger node 211 of organization C (step 309).

After that, in the distributed ledger node 211 of organization C, steps 310 to 313 are performed in the same manner as in steps 304 to 307 described above, and the transaction as the processing result is returned to the distributed ledger node 211 of organization A.

On the other hand, the end program 216 in the distributed ledger node 211 of organization A receives the transaction from the distributed ledger node 211 of organization C (step 314), and checks whether or not this transaction includes the signatures of all the organizations, that is, organizations A to C (step 315).

Note that if the signatures of all the organizations are not included in the transaction in the above-described process of checking the signatures, the distributed ledger node 211 of organization A shifts the processing to step 309 to repeat the processes of steps 309 to 314 until all required signatures are confirmed.

Subsequently, the end program 216 in the distributed ledger node 211 of organization A passes the transaction in which the required number of signatures are collected to the consensus program 214, and then the consensus program 214 creates an end block and distributes the end block to the distributed ledger nodes 211 of the respective organizations (step 316).

Here, the details of the end block 102 will be described. FIG. 4 is a diagram illustrating a configuration example of the end block 102 in the present embodiment. The end block 102 is a block connected to the end of the block chain 215 held by each of the distributed ledger nodes 211.

The blockchain 215 is composed of a start block 101 at the beginning and blocks (blocks 1 to n in FIG. 4) in which various transactions issued by the distributed ledger nodes 211 and others are grouped in every fixed period so that they are connected.

Of these, the start block 101 is a block that includes various data such as a certificate and a seed that is a source of a hash value.

On the other hand, the end block 102 is a block that has been issued by any of the distributed ledger nodes 211 according to the present embodiment and includes only the specific transaction 110 on which a consensus has been built between the organizations (distributed ledger nodes 211).

The transaction 110 described above stores the values of: signatures 111 of the organizations, hash values 121 of the groups, the group division information 130, the storage period 150, and the communication interval 160, which are required in the distributed ledger management method according to the present embodiment.

Note that the signature 111 of organization A included in the transaction 110 is an electronic signature that has been performed with the private key 217 on the transaction 110 when organization A confirmed and agreed with various conditions (the group division information 130, the group location information 140, the storage period 150, and the communication interval 160) described in the transaction 110.

Such an operation for the electronic signature is performed only as many times as the number of organizations (three times corresponding to three organizations A to C in the present embodiment). Therefore, in the example of FIG. 4, the signature of organization A, the signature of organization B, and the signature of organization C are included in the transaction 110. As a matter of course, the number of organizations described in the present embodiment is merely an example and is not limited to this.

The hash value 121 of the group is a result of calculating a hash value for the blocks included in each of the groups into which the connected blocks in the blockchain 215 are grouped according to the number of organizations. In the present embodiment, since the number of organizations is three, the groups are three groups from group 1 to group 3, and the hash value of each group is stored.

The group division information 130 is information indicating a form of grouping of each block in the blockchain 215.

In the example of FIG. 4, the blocks of the block chain 215 are divided into three groups 1 to 3 so that group 1 is assigned blocks 1, 4 and 7, group 2 is assigned blocks 2, 5 and 8, and group 3 is assigned blocks 3, 6 and 9.

Note that as such a grouping method, any form can be applied as appropriate. For example, for two organizations, the blocks of the blockchain 215 are divided in half from the beginning, the blocks are picked up every other block or randomly.

The group location information 140 is information that defines which group of blocks is to be held (is held) by each organization.

Note that each organization holds at least two groups (of blocks) so that the data of the blocks of the group can be restored even when it is tampered with.

For example, for three organizations as in the present embodiment, the groups are held in a form in which organizations A belongs to groups 1 and 3, organization B belongs to groups 1 and 2, and organization C belongs to groups 2 and 3 as illustrated in FIG. 4.

The storage period 150 describes a period for which the data of the blockchain 215 is to be stored. In the example of FIG. 4, the exemplified deadline for the end of the storage is illustrated instead of a period of time.

The communication interval 160 is information about the frequency at which the hash value is to be verified between the organizations to determine whether the information included in the blockchain 215 has been tampered with. In the example of FIG. 4, "1/day" is illustrated as a specific example of the communication interval 160. This example indicates a rule of performing communication for a tamper verification once a day.

Returning to FIG. 3, the explanation is continued. The distributed ledger node 211 of each organization specifies the group storing the group of blocks by itself based on the group division information 140 of the end block 102 received from the distributed ledger node 211 of organization A, and deletes the blocks of the groups other than the specified group in the blockchain 215 (step 317).

Subsequently, the distributed ledger node 211 of each organization performs a tamper verification of referring to the value of the storage period 150 from the end block 102 received from the distributed ledger node 211 of organization A, requesting the distributed ledger node 211 of another organization to transmit the group of blocks to be held by the organization (distributed ledger node 211) or its hash value at the time intervals indicated by the communication interval 160 until the date indicated by the value of the storage period 150, and collating the obtained hash value of the group with the hash value of the group held in the end block 102 of its own blockchain 215 (step 318).

If the hash values do not match as a result of the above-described tamper verification (step 319: Yes), the distributed ledger node 211 determines that the group has been tampered with, identifies another organization that holds the blocks of the same group from the group location information 140, acquires the blocks from the distributed ledger node 211 of that organization, and restores the data of the blocks of the group determined to have been tampered with (step 320).

When the distributed ledger node 211 of each organization detects the arrival of the expiration date indicated by the storage period 150 by its own calendar function or the like, the distributed ledger node 211 does not perform subsequent communication, that is, a tamper verification, and deletes the blocks of the group or stores the blocks of the group in another medium (step 321), and then the processing ends.

<<Other Embodiments>>

Figure 5:
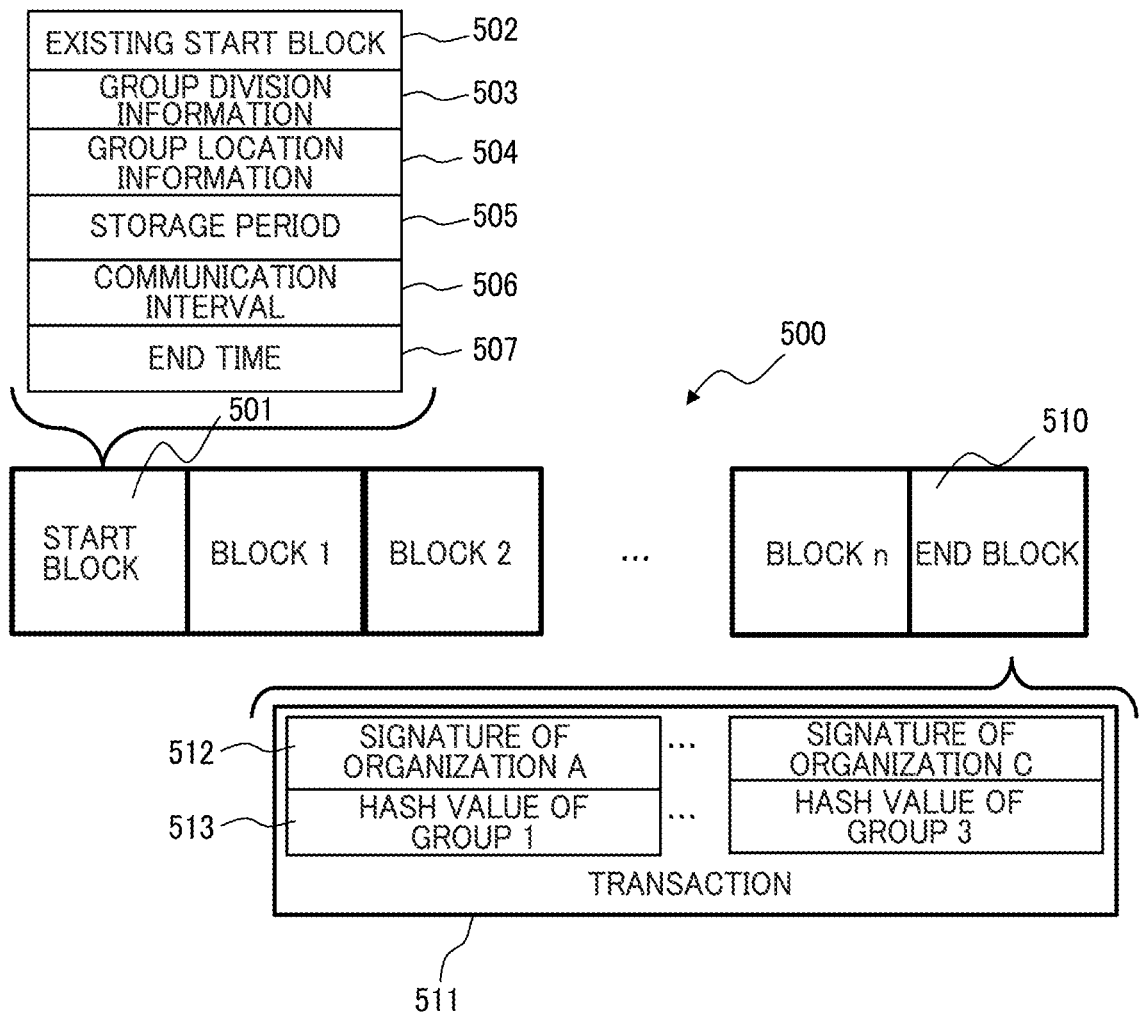
FIG. 5 is a diagram illustrating a configuration example of a start block and an end block in the present embodiment.

In addition to the above-described embodiment, another embodiment may be provided in which information on the end block 102 to be stored may be reduced. FIG. 5 is a diagram illustrating a configuration example of a start block 501 and an end block 510 in a block chain 500 according to the present embodiment.

In this case, the start block 501 includes values of: group division information 503, group location information 504, a storage period 505, a communication interval 506, and an end time 507, in addition to the information on an existing start block 502.

Of these, the end time 507 is a value that defines the time when the end block 510 is to be created. Therefore, the blockchain 500 before the arrival of the end time 507 includes no end block 510.

On the other hand, the end block 510 includes a transaction 511. This transaction 511 includes signatures 512 of organizations that have agreed to the hash values of the groups and hash values 513 of the groups.

Only the steps different from the sequence diagram of FIG. 3 described above will be described below. In this case, when the distributed ledger node 211 of organization A detects the arrival of the time indicated by the value of the end time 507 in the start block 501, or when the distributed ledger node 211 receives an operation from, for example, the person in charge 250 in the client device 251, the distributed ledger node 211 calls and executes the end program 216, divides the blocks of the blockchain 215 of its own organization into groups based on the group division information 503 included in the start block 501 of the blockchain 500, and calculates a hash value for the blocks of each of the groups (step 301).

Subsequently, the distributed ledger node 211 of organization A described above creates a transaction including the hash values calculated in step 301 and signs the transaction (step 302). Note that in this example, the group division information 503, the group location information 504, the storage period 505, and the communication interval 506 are included in the start block 501, and therefore do not need to be included in this transaction.

On the other hand, the end program 216 in the distributed ledger node 211 of organization B that has received the above-described transaction divides the blocks of the blockchain 215 of its own organization into groups based on the group division information 503 indicated by the start block 501 in its own blockchain 500, calculates a hash value of each of the groups (blocks), and compares the calculated hash values with the hash values of the respective groups included in the transaction received from the distributed ledger node 211 of organization A (step 305).

If the result of comparison described above indicates that there is no difference between the hash values, the end program 216 in the distributed ledger node 211 of organization B signs the transaction with the private key 217 (step 306). This signing is also performed in the distributed ledger node 211 of organization C in the same manner (step 312).

After that, the subsequent steps are performed in the same manner as in FIG. 3, the distributed ledger node 211 of each organization performs a tamper verification of requesting, based on the start block 501, the distributed ledger node 211 of another organization to transmit the group held by the distributed ledger node 211 or its hash value at the frequency indicated by the communication interval 506 until the arrival of the date indicated by the storage period 505, acquiring the hash value of the group, and collating the acquired hash value with the hash value of the group indicated in the end block 510 (step 318).

If the hash values are different as a result of the above-described tamper verification (step 319: Yes), the distributed ledger node 211 determines that the group has been tampered with, identifies another organization that holds the blocks of the same group from the group location information 504, acquires the blocks from the distributed ledger node 211 of that organization, and restores the data of the blocks of the group determined to have been tampered with (step 320).

In this way, writing in advance and managing the end conditions of the blockchain service in the start block 501 makes it possible to provide the blockchain service in which the end time is clearly specified.

Although the above description is specific for the best mode and the like for carrying out the present disclosure, the present disclosure is not limited to this, and various modifications are possible without departing from the spirit and scope of the disclosure.

According to the embodiments, it is possible to efficiently store the data stored in the blockchain, for a long period of time.

At least the following will be made clear by the description in the present specification. In the distributed ledger management method according to the present embodiment, each node may further hold the information about the storage period for the blocks in the transaction of the end block, and the tamper verification process may be repeatedly performed at the above frequency until the end of the storage period.

This makes it possible to continue to check for no tampering during the storage period in a case where information for which a storage period is legally specified is stored on the blockchain. As a result, it is possible to more efficiently store the data stored in the blockchain, for a long period of time.

In the distributed ledger management method according to the present embodiment, each node may hold, in the start block of the blockchain, division information of the blockchain, information on organizations by which the blocks are to be held, information on the verification frequency, and information on the creation time of the end block, issue, in response to the arrival of the creation time, a transaction including signatures of respective organizations operating the respective nodes and hash values of respective groups of blocks into which the blockchain is divided by the number of the organizations under the conditions indicated by the division information, and create and hold an end block with a certain consensus built.

This makes it possible to reduce the information on the end block to be stored, and as a result, to more efficiently store the data stored in the blockchain, for a long period of time.

In the distributed ledger management system according to the present embodiment, the storage device of each node may further hold the information about the storage period for the blocks in the transaction of the end block, and the computing device may repeatedly perform the tamper verification process at the above frequency until the end of the storage period.

In the distributed ledger management system according to the present embodiment, the storage device of each node may hold, in the start block of the blockchain, division information of the blockchain, information on organizations by which the blocks are to be held, information on the verification frequency, and information on the creation time of the end block, and the computing device may issue, in response to the arrival of the creation time, a transaction including signatures of respective organizations operating the respective nodes and hash values of respective groups of blocks into which the blockchain is divided by the number of the organizations under the conditions indicated by the division information, and create and hold an end block with a certain consensus built.

In the node according to the present embodiment, the storage device of each node may further hold the information about the storage period for the blocks in the transaction of the end block, and the computing device may repeatedly perform the tamper verification process at the above frequency until the end of the storage period.

In the node according to the present embodiment, the storage device of each node may hold, in the start block of the blockchain, division information of the blockchain, information on organizations by which the blocks are to be held, information on the verification frequency, and information on the creation time of the end block, and the computing device may issue, in response to the arrival of the creation time, a transaction including signatures of respective organizations operating the respective nodes and hash values of respective groups of blocks into which the blockchain is divided by the number of the organizations under the conditions indicated by the division information, and create and hold an end block with a certain consensus built.

What is claimed is:

1. A distributed ledger management method performed by each of nodes configuring a distributed ledger system, the distributed ledger management method comprising:

holding, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations;

specifying a group of blocks to be held by the organization operating the node by the transaction of the end block;

deleting a block other than the specified group of blocks in the blockchain; and performing a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

2. The distributed ledger management method according to claim 1, further comprising:

further holding, in the transaction of the end block, information about a storage period for the group of blocks; and repeatedly performing the tamper verification at the frequency until an end of the storage period.

3. The distributed ledger management method according to claim 1, further comprising:

holding, in a start block of the blockchain, division information of the blockchain, the information on organizations by which the group of blocks is to be held, the information about the verification frequency, and information on a creation time of the end block;

issuing, in response to arrival of the creation time, a transaction including the signatures of respective organizations operating the respective nodes and the hash values of respective groups of blocks into which the blockchain is divided by the number of organizations under a condition indicated by the division information; and creating and holding an end block with a certain consensus built.

4. A distributed ledger system comprising nodes, each of the nodes comprising:

a storage device configured to hold a blockchain that holds, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations; and a computing device configured to:

specify a group of blocks to be held by the organization operating the node by the transaction of the end block, delete a block other than the specified group of blocks in the blockchain, and perform a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

5. The distributed ledger system according to claim 4, wherein in each of the nodes, the storage device is configured to further hold, in the transaction of the end block, information about a storage period for the group of blocks, and the computing device is configured to repeatedly perform the tamper verification at the frequency until an end of the storage period.

6. The distributed ledger system according to claim 4, wherein in each of the nodes, the storage device is configured to hold, in a start block of the blockchain, division information of the blockchain, the information on organizations by which the group of blocks is to be held, the information about the verification frequency, and information on a creation time of the end block, and the computing device is configured to:

issue, in response to arrival of the creation time, a transaction including the signatures of respective organizations operating the respective nodes and the hash values of respective groups of blocks into which the blockchain is divided by the number of organizations under a condition indicated by the division information, and create and hold an end block with a certain consensus built.

7. A node that is one of nodes configuring a distributed ledger system, the node comprising:

a storage device configured to hold a blockchain that holds, in an end block, a transaction including signatures of respective organizations operating the respective nodes, hash values of respective groups of blocks into which a blockchain is divided by a number of the organizations, information on organizations by which the group of blocks is to be held, and information about a verification frequency for the hash value between the organizations; and a computing device configured to:

specify a group of blocks to be held by the organization operating the node by the transaction of the end block, delete a block other than the specified group of blocks in the blockchain, and perform a tamper verification of requesting a node of another organization other than the organization operating the corresponding node to transmit the group of blocks to be held by the other organization or the hash value of the group of blocks at a frequency indicated by the information about the verification frequency, and collating the hash value based on the group of blocks with the hash value of the group of blocks included in the transaction of the end block.

8. The node according to claim 7, wherein the storage device is configured to further hold, in the transaction of the end block, information about a storage period for the group of blocks, and the computing device is configured to repeatedly perform the tamper verification at the frequency until an end of the storage period.

9. The node according to claim 7, wherein the storage device is configured to hold, in a start block of the blockchain, division information of the blockchain, the information on organizations by which the group of blocks is to be held, the information about the verification frequency, and information on a creation time of the end block, and the computing device is configured to:
- issue, in response to arrival of the creation time, a transaction including the signatures of respective organizations operating the respective nodes and the hash values of respective groups of blocks into which the blockchain is divided by the number of organizations under a condition indicated by the division information, and
- create and hold an end block with a certain consensus built.

* * * * *